(12) United States Patent
Geiss

(10) Patent No.: US 9,131,201 B1
(45) Date of Patent: Sep. 8, 2015

(54) COLOR CORRECTING VIRTUAL LONG EXPOSURES WITH TRUE LONG EXPOSURES

(71) Applicant: Google Inc., Mountain View, CA (US)

(72) Inventor: Ryan Geiss, Mountain View, CA (US)

(73) Assignee: Google Inc., Mountain View, CA (US)

( * ) Notice: Subject to any disclaimer, the term of this patent is extended or adjusted under 35 U.S.C. 154(b) by 106 days.

(21) Appl. No.: 13/902,267

(22) Filed: May 24, 2013

(51) Int. Cl.
*H04N 5/238* (2006.01)
*H04N 9/77* (2006.01)
*H04N 5/235* (2006.01)
*H04N 5/355* (2011.01)

(52) U.S. Cl.
CPC .............. *H04N 9/77* (2013.01); *H04N 5/235* (2013.01); *H04N 5/2355* (2013.01); *H04N 5/35581* (2013.01)

(58) Field of Classification Search
CPC .............. H04N 5/2355; H04N 5/2351; H04N 5/35581; H04N 5/35554
USPC ........... 348/362, 363, 262, 263, 222.1, 221.1, 348/272, 225.1, 229.1, 220.1
See application file for complete search history.

(56) References Cited

U.S. PATENT DOCUMENTS

| | | | |
|---|---|---|---|
| 4,644,582 A | 2/1987 | Morishita et al. | |
| 5,781,308 A | 7/1998 | Fujii et al. | |
| 5,828,793 A | 10/1998 | Mann | |
| 5,926,190 A | 7/1999 | Turkowski et al. | |
| 6,061,091 A | 5/2000 | Van De Poel et al. | |
| 6,075,905 A | 6/2000 | Herman et al. | |
| 6,101,285 A | 8/2000 | Fan | |
| 6,204,881 B1 | 3/2001 | Ikeda et al. | |
| 6,539,116 B2 | 3/2003 | Takaoka | |
| 6,693,718 B1 | 2/2004 | Takaoka | |
| 6,925,121 B1 | 8/2005 | Komiya et al. | |
| 6,975,755 B1 | 12/2005 | Baumberg | |
| 7,098,946 B1 | 8/2006 | Koseki et al. | |
| 7,173,666 B1 | 2/2007 | Masaki et al. | |
| 7,239,342 B2 * | 7/2007 | Kingetsu et al. | 348/208.4 |
| 7,239,805 B2 | 7/2007 | Uyttendaele et al. | |
| 7,626,614 B1 | 12/2009 | Marcu | |

(Continued)

FOREIGN PATENT DOCUMENTS

| | | |
|---|---|---|
| JP | 2005-045804 | 2/2005 |
| JP | 2012-029029 | 2/2012 |

(Continued)

OTHER PUBLICATIONS

International Search Report and Written Opinion for PCT/US2014/011498 mailed Apr. 22, 2014, 11 pages.

(Continued)

*Primary Examiner* — Ahmed A Berhan
(74) *Attorney, Agent, or Firm* — McDonnell Boehnen Hulbert & Berghoff LLP

(57) ABSTRACT

A gain may be applied to a short-exposure image to form a virtual long-exposure image. The short-exposure image may have been captured using a short total exposure time (TET), the virtual long-exposure image may have a virtual long TET, and the virtual long TET may be greater than the short TET. A true long-exposure image may be captured using a true long TET. The true long TET may be substantially equal to the virtual long TET. Color values of at least some pixels of the true long-exposure image may be copied to corresponding pixels of the virtual long-exposure image.

20 Claims, 8 Drawing Sheets

(56) References Cited

U.S. PATENT DOCUMENTS

| | | | |
|---|---|---|---|
| 7,667,764 B2 | 2/2010 | Kamon et al. | |
| 7,840,093 B2 | 11/2010 | Fu et al. | |
| 7,903,168 B2 | 3/2011 | Pillman et al. | |
| 7,924,321 B2 | 4/2011 | Nayar et al. | |
| 7,940,325 B2 | 5/2011 | Kim et al. | |
| 7,944,485 B2 | 5/2011 | Ovsiannikov | |
| 8,023,004 B2* | 9/2011 | Asoma | 348/229.1 |
| 8,059,891 B2 | 11/2011 | Li et al. | |
| 8,072,507 B2 | 12/2011 | Fuh et al. | |
| 8,094,211 B2 | 1/2012 | Kwon et al. | |
| 8,200,020 B1 | 6/2012 | Geiss et al. | |
| 8,208,048 B2 | 6/2012 | Lin et al. | |
| 8,228,400 B2* | 7/2012 | Liu et al. | 348/239 |
| 8,237,813 B2 | 8/2012 | Garten | |
| 8,406,560 B2 | 3/2013 | Lee et al. | |
| 8,411,962 B1 | 4/2013 | Geiss et al. | |
| 8,446,481 B1 | 5/2013 | Geiss et al. | |
| 8,576,295 B2 | 11/2013 | Ito | |
| 8,866,927 B2 | 10/2014 | Levoy et al. | |
| 8,866,928 B2 | 10/2014 | Geiss | |
| 8,885,976 B1 | 11/2014 | Kuo et al. | |
| 2001/0019362 A1 | 9/2001 | Nakamura et al. | |
| 2003/0002750 A1 | 1/2003 | Ejiri et al. | |
| 2003/0095192 A1 | 5/2003 | Horiuchi | |
| 2004/0160525 A1* | 8/2004 | Kingetsu et al. | 348/364 |
| 2005/0147322 A1 | 7/2005 | Saed | |
| 2005/0163380 A1 | 7/2005 | Wang et al. | |
| 2005/0239104 A1 | 10/2005 | Ferea et al. | |
| 2005/0243176 A1 | 11/2005 | Wu et al. | |
| 2006/0269155 A1 | 11/2006 | Tener et al. | |
| 2006/0291740 A1 | 12/2006 | Kim et al. | |
| 2007/0003261 A1 | 1/2007 | Yamasaki | |
| 2007/0147824 A1 | 6/2007 | Hamamura | |
| 2008/0094486 A1 | 4/2008 | Fuh et al. | |
| 2008/0253758 A1 | 10/2008 | Yap et al. | |
| 2008/0278633 A1 | 11/2008 | Tsoupko-Sitnikov et al. | |
| 2008/0298717 A1 | 12/2008 | Lee | |
| 2009/0040364 A1 | 2/2009 | Rubner | |
| 2009/0123082 A1 | 5/2009 | Atanssov et al. | |
| 2009/0185622 A1 | 7/2009 | Itoh et al. | |
| 2009/0207258 A1 | 8/2009 | Jang et al. | |
| 2009/0222625 A1 | 9/2009 | Ghosh et al. | |
| 2009/0231445 A1 | 9/2009 | Kanehiro | |
| 2009/0231449 A1 | 9/2009 | Tzur et al. | |
| 2009/0231468 A1 | 9/2009 | Yasuda | |
| 2009/0244301 A1 | 10/2009 | Border et al. | |
| 2009/0268963 A1 | 10/2009 | Kang et al. | |
| 2009/0274387 A1 | 11/2009 | Jin | |
| 2009/0322901 A1 | 12/2009 | Subbotin et al. | |
| 2010/0066858 A1 | 3/2010 | Asoma | |
| 2010/0103194 A1 | 4/2010 | Chen et al. | |
| 2010/0150473 A1 | 6/2010 | Kwon et al. | |
| 2010/0157078 A1 | 6/2010 | Atanassov et al. | |
| 2010/0165075 A1 | 7/2010 | Chou et al. | |
| 2010/0166337 A1 | 7/2010 | Murashita et al. | |
| 2010/0265357 A1* | 10/2010 | Liu et al. | 348/223.1 |
| 2010/0277631 A1 | 11/2010 | Sugiyama | |
| 2010/0321539 A1 | 12/2010 | Ito | |
| 2010/0328490 A1 | 12/2010 | Kurane et al. | |
| 2010/0328491 A1 | 12/2010 | Ovsiannikov | |
| 2011/0047155 A1 | 2/2011 | Sohn et al. | |
| 2011/0069200 A1 | 3/2011 | Oh et al. | |
| 2011/0085697 A1 | 4/2011 | Clippard et al. | |
| 2011/0149111 A1 | 6/2011 | Prentice et al. | |
| 2011/0157426 A1 | 6/2011 | Lin et al. | |
| 2011/0200265 A1 | 8/2011 | Prigent | |
| 2011/0222793 A1 | 9/2011 | Ueda et al. | |
| 2011/0228993 A1 | 9/2011 | Reilly et al. | |
| 2011/0254976 A1 | 10/2011 | Garten | |
| 2011/0279706 A1 | 11/2011 | Lesiak et al. | |
| 2012/0002082 A1 | 1/2012 | Johnson et al. | |
| 2012/0002898 A1 | 1/2012 | Cote et al. | |
| 2012/0002899 A1 | 1/2012 | Orr, IV et al. | |
| 2012/0044381 A1 | 2/2012 | Jannard et al. | |
| 2012/0050557 A1 | 3/2012 | Atanassov et al. | |
| 2012/0105681 A1 | 5/2012 | Morales | |
| 2012/0127348 A1 | 5/2012 | Li | |
| 2012/0189197 A1 | 7/2012 | Li et al. | |
| 2012/0201426 A1 | 8/2012 | Jasinski et al. | |
| 2012/0201450 A1 | 8/2012 | Bryant et al. | |
| 2012/0201456 A1 | 8/2012 | El-Mahdy et al. | |
| 2012/0219235 A1 | 8/2012 | Solhusvik et al. | |
| 2012/0249828 A1 | 10/2012 | Sun | |
| 2012/0308126 A1 | 12/2012 | Hwang et al. | |
| 2012/0314100 A1 | 12/2012 | Frank | |
| 2013/0033616 A1 | 2/2013 | Kaizu et al. | |
| 2013/0083216 A1 | 4/2013 | Jiang et al. | |
| 2013/0100314 A1 | 4/2013 | Li et al. | |
| 2013/0121569 A1 | 5/2013 | Yadav | |
| 2013/0329092 A1 | 12/2013 | Wong | |
| 2014/0042233 A1 | 2/2014 | Yang | |
| 2014/0219578 A1 | 8/2014 | Peng et al. | |

FOREIGN PATENT DOCUMENTS

| | | |
|---|---|---|
| KR | 10-2007-0085867 | 8/2007 |
| KR | 10-0911814 | 8/2009 |
| KR | 10-2010-0086987 | 8/2010 |
| WO | 98/02844 | 1/1998 |
| WO | 2004/098167 | 11/2004 |
| WO | 2011/093994 | 8/2011 |
| WO | 2011/102850 | 8/2011 |
| WO | 2012/027290 | 3/2012 |
| WO | 2012/039669 | 3/2012 |
| WO | 2012/061261 | 5/2012 |
| WO | 2012/098842 | 7/2012 |
| WO | 2012/110894 | 8/2012 |

OTHER PUBLICATIONS

Bauer et al., "Comparing Several Implementations of Two Recently Published Feature Detectors," In Proc. of the International Conference on Intelligent and Autonomous Systems, IAV, Toulouse, France (2007).

Bay et al., "SURF: Speeded Up Robust Features," 9th European Conference on Computer Vision, 2008, pp. 346-359, vol. 110, No. 3.

Brown, M. & Lowe, D., "Invariant Features from Interest Point Groups," Computer, (2002) p. 253-262, Available at: http://citeseerx.ist.psu.edu/viewdoc/download?doi=10.1.1.73.5616&rep=rep1&type=pdf.

Cyganek, Bogusł aw, "Comparison of nonparametric transformations and bit vector matching for stereo correlation." Combinatorial Image Analysis, 2005, pp. 534-547.

Duan et al., "Tone-mapping High Dynamic Range Images by Novel Histogram Adjustment," Pattern Recognition, 2010, 39 pages, vol. 43, No. 5.

"Exposure (photography)," Wikipedia, the free encyclopedia, Jun. 21, 2012, pp. 1-8 (http://en.wikipedia.org/wiki/Autoexposure#Automatic_exposure).

Fife, Wade S. et al., "Improved Census Transforms for Resource-Optimized Stereo Vision," IEEE Transactions on Circuits and Systems for Video Technology, Jan. 2013, vol. 23, No. 1, pp. 60-73.

Gelfand, Natasha, et al. "Multi-exposure imaging on mobile devices." In Proceedings of the international conference on Multimedia, ACM, 2010, pp. 823-826.

Hansen, Christian et al., "Chapter 1: The Image Deblurring Problem," Deblurring Images: Matrices, Spectra, and Filtering, SIAM, Philadelphia, 2006, pp. 1-12.

"High dynamic range imaging," Wikipedia, the free encyclopedia, Jun. 21, 2012, pp. 1-11 (http://en.wikipedia.org/wiki/High_dynamic_range_imaging).

"JPEG," Wikipedia, the free encyclopedia, Jul. 31, 2012, pp. 1-16 (http://en.wikipedia.org/wiki/JPEG).

Karpenko et al., "Digital Video Stabilization and Rolling Shutter Correction using Gyroscopes," Stanford Tech Report CTSR 2011-03, http://graphics.stanford.edu/papers/stabilization/karpenko_gyro.pdf (Sep. 2011).

Lowe, D.G., "Object Recognition from Local Scale-Invariant Features," Proc. of the International Conference on Computer Vision, Sep. 20-22, 1999, pp. 1150-1157, vol. 2.

(56) References Cited

OTHER PUBLICATIONS

"Metering mode," Wikipedia, the free encyclopedia, Jun. 25, 2012, pp. 1-3 (http://en.wikipedia.org/wiki/Metering_mode).

Nayar et al., "Adaptive Dynamic Range Imaging: Optical Control of Pixel Exposures Over Space and Time," Proceedings of the Ninth IEEE International Conference on Computer Vision (ICCV'03), 2003, pp. 1-8.

Özuysal et al., "Fast Keypoint Recognition in Ten Lines of Code," Computer Vision and Pattern Recognition, IEEE Computer Society Conference on in Computer Vision and Pattern Recognition, 2007. CVPR '07. IEEE Conference on, vol. 0 (2007), pp. 1-8. doi:10.1109/CVPR.2007.383123 Key: citeulike:2943111.

Seemann, Torsten et al., "Structure preserving noise filtering of images using explicit local segmentation." Fourteenth International Conference on Pattern Recognition, IEEE, 1998, vol. 2, pp. 1610-1612.

SIFT, accessed on Oct. 21, 2011, from Wikipedia, http://en.wikipedia.org/w/index.php?title=Special:Book&bookcmd=download&collection_id=1bf75abdad524091&writer=rl&return_to=Scale-invariant+feature+transform.

Sinha et al., "Feature Tracking and Matching in Video Using Programmable Graphics Hardware," Machine Vision and Applications, DOI 10.1007/s00138-007-0105-z, Nov. 2007.

SURF, accessed on Oct. 24, 2011, from Wikipedia, http://en.wikipedia.org/wiki/SURF.

SynthCam iPhone, https://sites.google.com/site/marclevoy/Tutorial accessed Oct. 24, 2011.

Ta, Duy-Nguyen et al., "SURFTrac: Efficient Tracking and Continuous Object Recognition using Local Feature Descriptors," IEEE Computer Society Conference on Computer Vision and Pattern Recognition, 2009, pp. 2937-2944.

"Tone mapping," Wikipedia, the free encyclopedia, Jun. 21, 2012, pp. 1-10 (http://en.wikipedia.org/wiki/Tone_mapping).

Wagner et al., "Pose Tracking from Natural Features on Mobile Phones," Proceeding ISMAR '08 Proceedings of the 7th IEEE/ACM International Symposium on Mixed and Augmented Reality IEEE Computer Society Washington, DC, USA, Sep. 15-18, 2008, pp. 125-134.

Wagner et al., "Real-time detection and tracking for augmented reality on mobile phones," IEEE Trans Vis Comput Graph, May-Jun. 2010, pp. 355-68, vol. 16, No. 3.

Winder, S.A.J. and Brown, M., "Learning Local Image Descriptors," Computer Vision and Pattern Recognition, 2007. CVPR '07. IEEE Conference on in Computer Vision and Pattern Recognition, 2007. CVPR '07. IEEE Conference on (Jun. 2007), pp. 1-8. doi:10.1109/CVPR.2007.382971 Key: citeulike:1663569.

"YCbCr," Wikipedia, the free encyclopedia, Jul. 31, 2012, pp. 1-5 (http://en.wikipedia.org/wiki/YCbCr).

Zabih et al., "Non-parametric Local Transforms for Computing Visual Correspondence," In Proceedings of European Conference on Computer Vision, Stockholm, Sweden, May 1994, pp. 151-158.

Notice of Allowance for U.S. Appl. No. 13/610,288 mailed Feb. 28, 2013, 31 pages.

International Searching Authority, International Search Report and Written Opinion for International Application No. PCT/US2014/038963 mailed Sep. 17, 2014, 12 pages.

Office Action for U.S. Appl. No. 13/718,533 mailed Apr. 22, 2014, 48 pages.

Office Action for U.S. Appl. No. 13/863,981 mailed Jun. 24, 2014, 23 pages.

Notice of Allowance for U.S. Appl. No. 13/718,533 mailed Jul. 18, 2014, 9 pages.

Notice of Allowance for U.S. Appl. No. 13/713,720 mailed Jul. 18, 2014, 13 pages.

Office Action for U.S. Appl. No. 13/863,981 mailed Oct. 7, 2013, 45 pages.

International Searching Authority, International Search Report and Written Opinion for PCT/US2013/072638 mailed Mar. 11, 2014, 10 pages.

International Searching Authority, International Search Report and Written Opinion for PCT/US2013/071663 mailed Mar. 13, 2014, 9 pages.

International Searching Authority, International Search Report and Written Opinion for PCT/US2013/72564 mailed Mar. 11, 2014, 13 pages.

International Searching Authority, International Search Report and Written Opinion for PCT/US2013/071459 mailed Mar. 13, 2014, 9 pages.

Notice of Allowance for U.S. Appl. No. 13/305,389 mailed Feb. 22, 2012, 9 pages.

Notice of Allowance for U.S. Appl. No. 13/458,334 mailed Oct. 11, 2012, 34 pages.

Jin et al., "Face Detection Using Improved LBP Under Bayesian Framework," Proceedings of the Third International Conference on Image and Graphics (ICIG'04), 2004, pp. 1-4.

Mandava et al., "Speckle Noise Reduction Using Local Binary Pattern," 2nd International Conference on Communication, Computing & Security (ICCCS-2012), Procedia Technology, 2012, pp. 574-581, vol. 6.

Office Action for U.S. Appl. No. 13/743,565 mailed Sep. 4, 2014, 20 pages.

Office Action for U.S. Appl. No. 13/722,519 mailed Sep. 4, 2014, 10 pages.

Office Action for U.S. Appl. No. 13/759,749 mailed Sep. 24, 2014, 38 pages.

International Searching Authority, International Search Report and Written Opinion for PCT/US2013/071618 mailed Mar. 3, 2014, 9 pages.

International Searching Authority, International Search Report and Written Opinion for PCT/US2013/072569 mailed Mar. 6, 2014, 9 pages.

Final Office Action, U.S. Appl. No. 13/863,981 mailed Apr. 8, 2014, 26 pages.

Office Action, U.S. Appl. No. 13/713,720, mailed Apr. 8, 2014, 46 pages.

Office Action for U.S. Appl. No. 13/849,824 mailed Nov. 5, 2014, 14 pages.

Notice of Allowance for U.S. Appl. No. 13/743,565 mailed Dec. 2, 2014, 15 pages.

Notice of Allowance for U.S. Appl. No. 14/455,444 mailed Oct. 2, 2014, 9 pages.

Office Action for U.S. Appl. No. 13/902,254 mailed Dec. 2, 2014, 9 pages.

Office Action for U.S. Appl. No. 13/722,519 mailed Feb. 19, 2015, 11 pages.

Office Action for U.S. Appl. No. 14/488,891 mailed Feb. 13, 2015, 6 pages.

Office Action for U.S. Appl. No. 13/847,238 mailed Jan. 2, 2015, 6 pages.

Notice of Allowance for U.S. Appl. No. 13/863,981 mailed Apr. 9, 2015, 8 pages.

Notice of Allowance for U.S. Appl. No. 13/713,734 mailed Apr. 14, 2015, 11 pages.

Notice of Allowance for U.S. Appl. No. 13/847,238 mailed Apr. 10, 2015, 5 pages.

Notice of Allowance for U.S. Appl. No. 13/849,824 mailed Apr. 9, 2015, 12 pages.

Notice of Allowance for U.S. Appl. No. 13/902,253 mailed Mar. 9, 2015, 7 pages.

Corrected Notice of Allowability U.S. Appl. No. 13/902,253 mailed Mar. 27, 2015, 2 pages.

Office Action for U.S. Appl. No. 14/582,470 mailed Feb. 26, 2015, 7 pages.

Final Office Action for U.S. Appl. No. 13/759,749 mailed Apr. 9, 2015, 12 pages.

Final Office Action for U.S. Appl. No. 13/863,981 mailed Dec. 24, 2014, 21 pages.

Office Action for U.S. Appl. No. 13/713,734 mailed Dec. 24, 2014, 12 pages.

* cited by examiner

COLOR CORRECTING VIRTUAL LONG EXPOSURES WITH TRUE LONG EXPOSURES

BACKGROUND

Generally, imaging may refer to capturing and representing the color and brightness characteristics of digital images (e.g., photographs and motion video). Low dynamic range (LDR) imaging may represent digital images with 8 or fewer bits for each color channel of a pixel. As a result, up to 256 levels of brightness may be supported. Currently, a wide range of video output devices (e.g., computer monitors, tablet and smartphone screens, televisions, etc.) support displaying LDR images.

However, real-world scenes often exhibit a wider range of brightness than can be represented by LDR imaging. As an example scene with a wide brightness range, consider an individual standing in a dark room in front of a window. This scene may include both extremely bright regions (e.g., sunlit features outside the window) and extremely dark regions (e.g., the features in the room). Ideally, an image of this scene would include both the details in the bright regions and the details in the dark regions.

SUMMARY

Forming an HDR image of a scene may involve capturing images of the scene using two or more exposure times (e.g., short exposures, long exposures, and possibly other exposure times as well), and then combining these images so that the resulting output image displays details of both the bright and dark regions of the scene. However, combining short-exposure images and long-exposure images may be difficult due to motion. Further, motion can cause these combining procedures to fail when the short-exposure image and long-exposure image cannot be properly aligned.

One way to avoid these drawbacks is to capture two or more short-exposure images, combine them into a merged short-exposure image, and then apply digital gain to this merged short-exposure image. The result may be referred to as a virtual long-exposure image, as it approximates the characteristics of a long-exposure image of the scene. The virtual long-exposure image may be combined with the merged short-exposure image using HDR procedures. Advantageously, the virtual long-exposure image need not be aligned with the merged short-exposure image before combining.

Accordingly, in a first example embodiment, total exposure time (TET) may be selected. A plurality of images of a scene may be captured using respective TETs that are based on the selected TET. At least two of the images in the plurality of images may be combined to form a merged short-exposure image. A digital gain may be applied to the merged short-exposure image to form a virtual long-exposure image. The merged short-exposure image and the virtual long-exposure image may be combined to form an output image. More of the output image may be properly-exposed than either of the merged short-exposure image or the virtual long-exposure image.

A second example embodiment may include means for selecting a TET. The second example embodiment may also include means for capturing a plurality of images of a scene, wherein the images in the plurality of images are captured using respective TETs that are based on the selected TET. The second example embodiment may additionally include means for combining at least two of the images in the plurality of images to form a merged short-exposure image, and means for applying a digital gain to the merged short-exposure image to form a virtual long-exposure image. The second example embodiment may further include means for combining the merged short-exposure image and the virtual long-exposure image to form an output image, wherein more of the output image is properly-exposed than either of the merged short-exposure image or the virtual long-exposure image.

In a third example embodiment, a gain may be applied to a short-exposure image to form a virtual long-exposure image. The short-exposure image may have been captured using a short TET, the virtual long-exposure image may have a virtual long TET, and the virtual long TET may be greater than the short TET. A true long-exposure image may be captured using a true long TET. The true long TET may be substantially equal to the virtual long TET. Color values of at least some pixels of the true long-exposure image may be copied to corresponding pixels of the virtual long-exposure image.

A fourth example embodiment may include means for applying gain to a short-exposure image to form a virtual long-exposure image, wherein the short-exposure image was captured using a short TET, the virtual long-exposure image has a virtual long TET, and the virtual long TET is greater than the short TET. The fourth example embodiment may also include means for capturing a true long-exposure image using a true long TET, wherein the true long TET is substantially equal to the virtual long TET. The fourth example embodiment may further include copying color values of at least some pixels of the true long-exposure image to corresponding pixels of the virtual long-exposure image.

A fifth example embodiment may include a non-transitory computer-readable storage medium, having stored thereon program instructions that, upon execution by a computing device, cause the computing device, and/or its peripherals, to perform operations in accordance with the first, second, third, and/or fourth example embodiment.

A sixth example embodiment may include a computing device, comprising at least a processor and data storage. The data storage may contain program instructions that, upon execution by the processor, cause the computing device operate in accordance with the first, second, third, and/or fourth example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
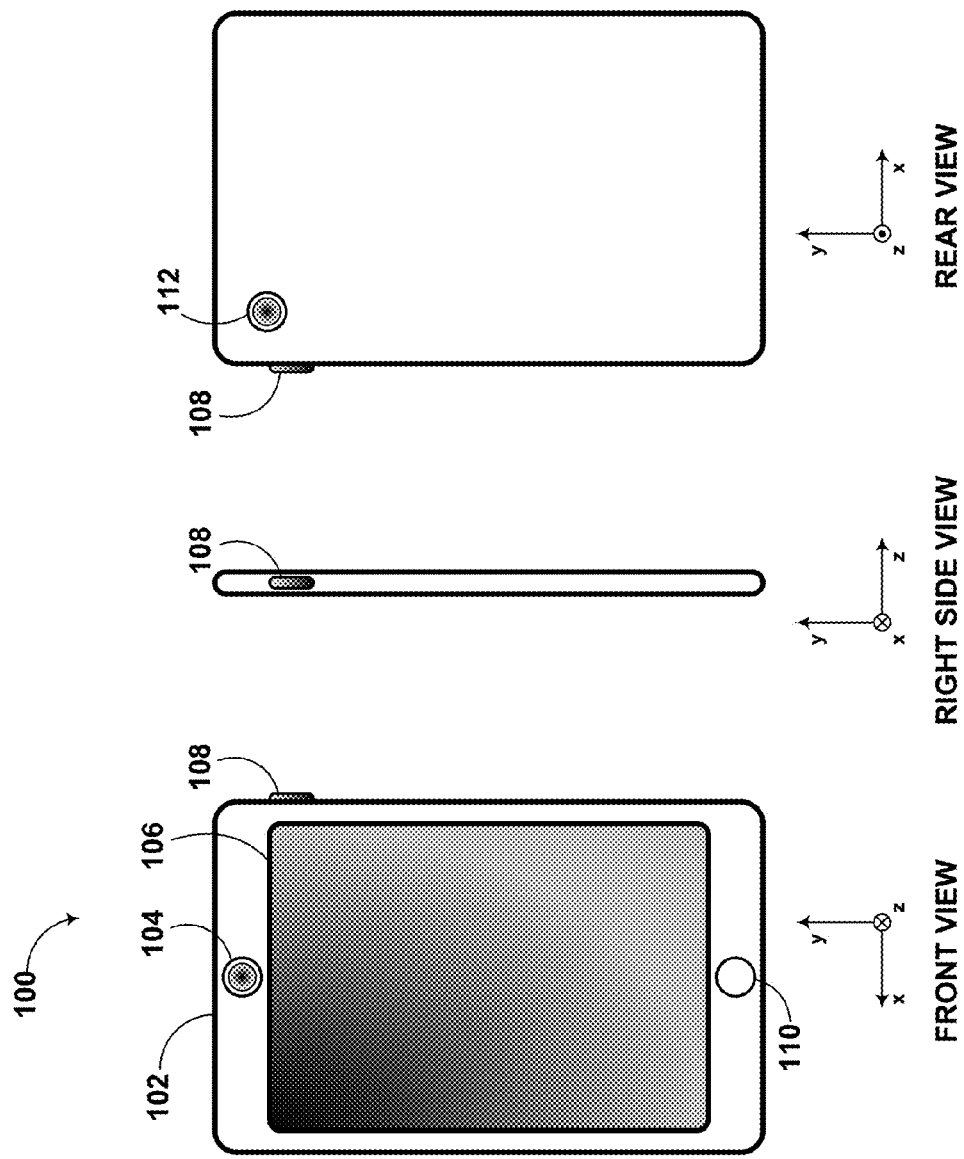
FIG. 1 depicts front, right side, and rear views of a digital camera device, in accordance with an example embodiment.

As image capture devices, such as cameras, become more popular, they may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

The physical components of a camera may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface. In some embodiments, "true exposure time" may refer to the length of time of an exposure before any gain is applied.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While it should be understood that the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless communication device, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
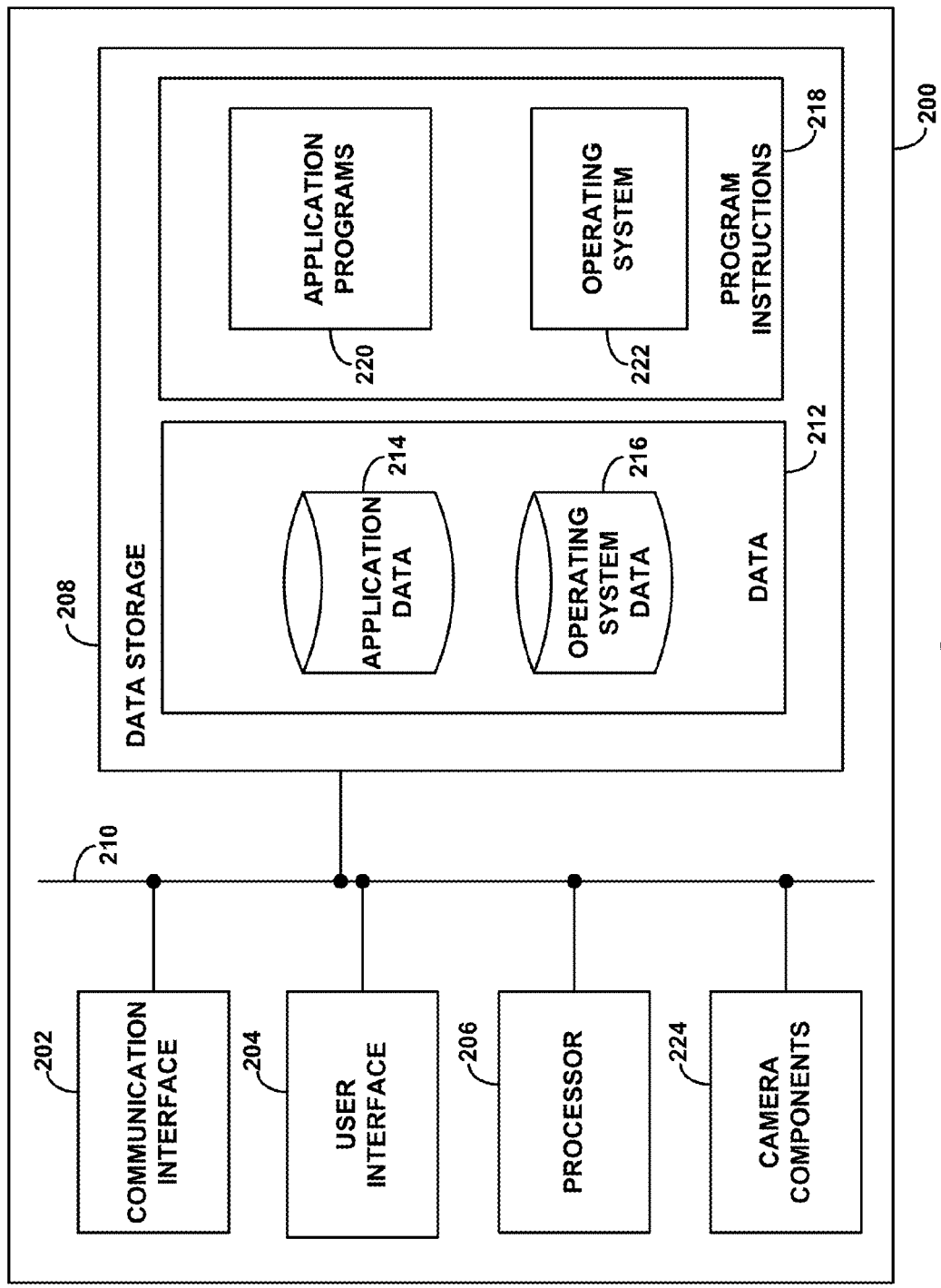
FIG. 2 depicts a block diagram of a computing device with image capture capability, in accordance with an example embodiment.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model (which may also be referred to as the YUV color model). In this color model, the Y color channel may represent the brightness of a pixel, and the Cb (U) and Cr (V) color channels may represent the blue chrominance and red chrominance, respectively, of the pixel. For instance, each of these color channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

Some pixel encodings—including the YCbCr color model—use 8 bits to represent the brightness of each pixel. Doing so is referred to as LDR imaging. As a result, only 256 levels of brightness may be supported. However, real-world scenes often exhibit a wider dynamic range of brightness than can be reasonably represented by LDR imaging. For example, a scene of an individual standing in a dark room in front of a window may include both extremely bright regions and extremely dark regions. However, use of LDR imaging to capture an image of such a scene may result in loss of detail in the bright region and/or the dark region based on the TET with which the image was captured.

A short TET may result in a reasonably accurate representation of the bright regions of a scene, but underexposure of the dark regions. Conversely, a long TET may result in a reasonably accurate representation of the dark regions, but may overexpose the bright regions. In the example scene introduced above, if the TET is too long, the features in the room may appear properly-exposed, but the features outside the window may appear whitewashed. But if the TET is too short, the features outside the window may appear normal but the features in the room may appear darkened. Either of these outcomes is undesirable. For some scenes, there may not be a single TET that results in a captured image representing the details in both bright regions and dark regions with acceptable detail.

Camera devices may support an auto-exposure (AE) mode in which, prior to output image capture, the camera determines the TET based on the brightness of the scene. For example, the user may observe the scene in the camera's viewfinder before triggering image capture. During this period, the camera may make an initial estimate of the proper TET, capture a preview image with that TET, and then evaluate the pixels in the captured image. Then, as one possible implementation, if a majority (or some other sufficient fraction) of the pixels in the preview image are over-exposed, the camera may decrease the TET and capture another preview image. If a majority (or some other sufficient fraction) of the pixels in this preview image are under-exposed, the camera may increase the TET and capture yet another preview image.

For instance, if the majority of the pixels in the captured image exhibit a brightness value above a high threshold level (e.g., 240), the camera may decrease the TET. On the other hand, if a majority of the pixels exhibit a brightness level below a low threshold level (e.g., 96), the camera may increase the TET.

Alternatively or additionally, a target average pixel value for some or all of the scene's pixels may be determined. If the actual average pixel value is above the target average pixel value, the TET may be decreased, and if the actual average pixel value is below the target average pixel value, the TET may be increased. The target average pixel value can also be tuned differently depending on how much contrast there is in the scene. For example, in a low-contrast scene, the target average pixel value may be bright (e.g., 200). But in a high-contrast scene, the target average pixel value may be lower (e.g., 128).

This process may continue until the camera determines that an image should be captured and stored (e.g., the user activates the shutter button). During this process, if the characteristics of the scene are relatively unchanging, the camera usually converges on an estimated "best" TET based on the brightness of the scene. In some embodiments, the image displayed on the camera's viewfinder may omit information from one or more of the captured preview images or combine information from two or more of the captured preview images.

In some cases, the camera might not treat all pixels equally when determining an "average" brightness of the scene. Using a technique described as "center-weighted averaging," pixels near the middle of the scene may be considered to be more important. Thus, these pixels may be weighted more than pixels illustrating other areas of the scene. Alternatively, pixels in other locations of an image may be given more weight. For instance, if the camera detects a human face (or some other object of interest) in a particular location other than the center of the image, the camera may give a higher weight to the associated pixels.

In this way, AE algorithms may seek to determine a TET that produces a large number (e.g., the largest number) of properly-exposed pixels. However, given the range limitations of LDR imaging, even images captured in AE mode may contain portions that are whitewashed or darkened. Thus, as noted above, some scenes there may be no single "best" TET.

Herein, a pixel may be considered to be "properly-exposed" if its brightness value is within a predefined range. For 8-bit brightness values, this range might be, for instance, 32-224, 16-240, 96-240, 128-240, and so on. A pixel is "improperly-exposed" if its brightness value falls outside of this range (i.e., the pixel is either under-exposed or over-exposed). However, brightness values may be encoded using more or fewer bits, and the pre-defined range may be different than the example ranges given above.

AE algorithms may differ from the description above. For instance, some may be more complex, treating different colors differently, considering the spatial and/or structural components of a scene, and/or measuring contrast between regions. The embodiments herein, however, may operate with any AE algorithm now known or developed in the future.

High dynamic range (HDR) imaging has been proposed as a way of compensating for the deficiencies of LDR imaging. In a possible implementation, HDR imaging may involve a camera capturing multiple images of a scene at various TETs, and then digitally processing these captured images to make a single image that contains a reasonable representation of the details in most or all regions of the scene, including those that are very bright and very dark. However, determining TETs for capturing images can be problematic. In particular, difficulty in adjusting TETs for a particular scene has created limitations in HDR imaging. The methods and implementations described herein may provide computational efficiency, robustness to artifacts, and/or enhanced image quality.

In the following, the term "LDR image" may refer to an image captured using LDR imaging, and the term "LDR scene" may refer to a scene that has been determined to be reasonably represented using LDR imaging. Similarly, the term "HDR image" may refer to an image captured using HDR imaging, and the term "HDR scene" may refer to a scene that has been determined to be reasonably represented using HDR imaging. Furthermore, the term "LDR imaging" may be used interchangeably with the term "LDR image acquisition," and the term "HDR imaging" may be used interchangeably with the term "HDR image acquisition."

Figure 3:
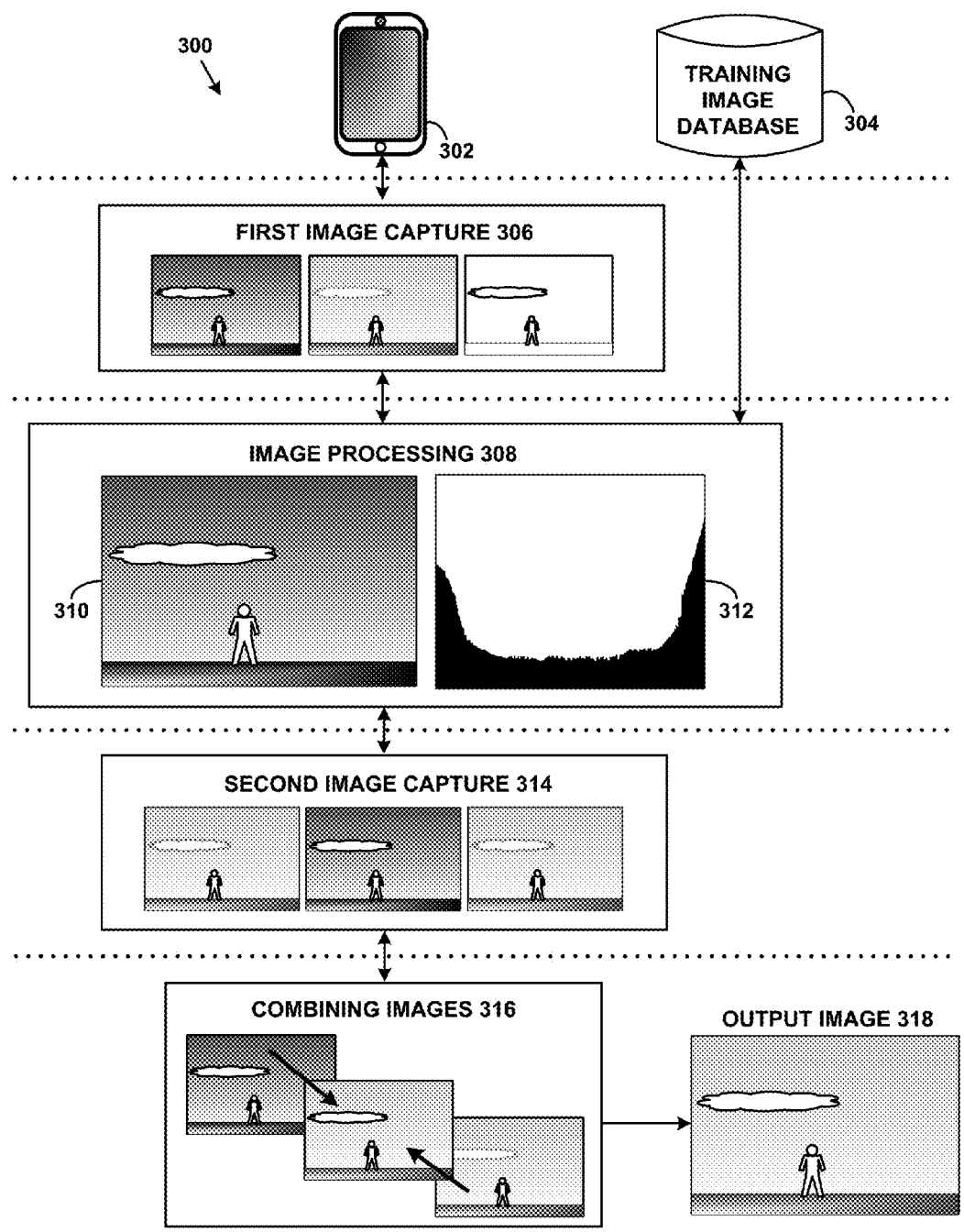
FIG. 3 depicts a flow chart, in accordance with an example embodiment.

FIG. 3 depicts a flow chart, in accordance with an example embodiment. At a high level, flow chart 300 represents an imaging pipeline for a digital camera device 302. For instance, flow chart 300 may represent a number of steps performed by digital camera device 302 to determine whether to use LDR or HDR image acquisition for a particular scene, determine one or more TETs with which to capture images of the scene, and whether and/or how to combine the captured images into an output image that is a reasonably satisfactory representation of the scene. In this way, digital camera device 302 can dynamically adapt to the lighting pattern of the scene, whether that pattern is dark, bright, or some combination of both. Digital camera device 302 may have the same or similar capabilities as digital camera device 100 in FIG. 1.

Flow chart 300 may represent a series of steps performed by digital camera device 302 when a shutter button is triggered. Alternatively or additionally, flow chart 300 may represent steps that are continuously performed when a viewfinder of digital camera device 302 is displaying a representation of a scene. Thus, in some embodiments, the features of flow chart 300 may be performed in a way that is not apparent to the user. For instance, the user may trigger the shutter once, with the intention of capturing a single image. However, digital camera device 302 may capture multiple images in each of first image capture 306 and second image capture 314, and provide an output image 318 that is a combination of one or more images captured during second image capture 314.

It should be noted that not all steps depicted in FIG. 3 need be performed by digital camera device 302. Some steps, such as image processing 308 and combining images 316, for example, could be performed by a different device. For instance, representations of one or more images captured during first image capture 306 and second image capture 314 could be transmitted from a capturing device to a remote computing device. The remote computing device could them perform image processing 308 and combining images 316, possibly transmitting some or all of the results thereof to the capturing device.

Additionally, training image database 304 may be included in digital camera device 302 or alternatively, training image database 304 may be part of a separate device or system that may be accessed by digital camera device 302. In some embodiments, training image database 304 may include representations of training images that can be used to help determine the structure of a payload burst used in second image capture 314.

In first image capture 306, a first group of images of a scene may be captured using a "metering burst sweep." In a metering burst sweep, each image in the group may be captured with a different TET. In some instances, the metering burst sweep may capture consecutive images across a range of TETs (e.g., 1-300 milliseconds, 0.1-500 milliseconds, or some other range). Using such ranges of TETs, the metering burst sweep may capture a series of images with TETs designed to cover this range according to a linear, logarithmic, and/or exponential distribution of TETs, among other possibilities.

As an example, FIG. 3 depicts first image capture 306 including three digital images of a scene, each captured with a different TET. The three images exhibit diverse levels of brightness due to the different TETs used to capture the images. In other examples, more or fewer images may be captured during first image capture 306. These captured images may provide parameters for digital camera device 302 to use when capturing subsequent images of the scene.

The metering burst sweep can be used to determine the characteristics of the scene so that a subsequent payload burst structure for second image capture 314 can be selected. Therefore, in step 308, the images captured at step 306 may be processed. Particularly, step 308 may include merging one or more of the images captured at step 306 in a combined image 310. Step 308 may also include forming a histogram 312 from the merged images, and then using the histogram, and possibly some or all of the information in training image data 304, to classify the scene (e.g., as an LDR scene or an HDR scene), determine the structure of the payload burst based on the classification of the scene, and determine the TETs to use when capturing images according to the payload burst. In some embodiments, the captured images, shown as a result of first image capture 306, may be downsampled prior to merging. Further, the histogram may be an LDR histogram, HDR histogram, a log HDR histogram, or some other form of histogram.

In step 314, the second group of images may be captured. The number of images captured and the arrangement of TETs used to capture these images may be referred to as a "payload burst." For example, in FIG. 3 second image capture 314 includes three images of a scene, each captured with a TET identified in step 308. It should be understood that the TETs identified in step 308 may be the same or different than the TETs used to capture images in step 306. Additionally, it is possible that all three images in second image capture 314 are captured with the same or similar TETs.

In step 316, images from the second group of images may be combined. Combining images may include aligning two or more of the images. In some instances, images may be aligned globally (i.e., aligning whole images as opposed to portions of images), locally (i.e., aligning portions of images perhaps at the pixel block and/or individual pixel level), or possibly both globally and locally. Further, combining two or more images may also include merging them to form an output image 318. This merging may be carried out in accordance with any image fusion technique now known or developed in the future.

Merging the images in the second group of images may result in output image 318 being sharper and/or better-exposed than any of the individual images in the second group. For instance, if some of the images in second image capture 314 are captured with the same or similar TETs, these images may be merged to reduce noise in one or more sections of the images. Alternatively or additionally, if the images in second image capture 314 are captured with two or more different TETs, at least some images with different exposure times may be merged according to HDR procedures. Regardless, the output image may be stored on a computer-readable medium and/or displayed on an output medium such as the multi-element display 106 of FIG. 1.

In some embodiments, the arrangements of various possible payload burst structures may be determined based on the TETs determined in step 308, as well as an understanding of combining images step 316. While numerous arrangements of payload burst structures may be possible, three examples are described herein.

TABLE 1

| Scene Type | Payload Burst Structure |
|---|---|
| LDR | T T T T |
| HDR | L S L L S L L S L L |
| HDR (with fallback) | L S L L S L L F F F |

Table 1 illustrates these examples. In the first example, the scene type is LDR. In this example, the payload burst structure includes four images captured sequentially, and may be referred to as an "LDR burst structure." Each "T" in the Payload Burst Structure column of Table 1 may represent a captured image. Each of these images may be captured using the same or a similar TET that was determined in step 308. In some embodiments, fewer or more images may be captured in an LDR payload burst. For example, as few as one, or as many as ten or more images may be included.

Regardless of the number of images captured, some of these images may be aligned and combined in step 316. For instance, if m images are captured in the payload burst, the sharpest one of these images may be selected as a "primary image," and the remaining m−1 images may be considered "secondary images." In some implementations, the sharpness of an image may be measured by the image's resolution and/or boundaries between zones of different tones and/or colors in the image. Alternatively or additionally, other sharpness measurements may be used.

Further, zero or more of the m−1 secondary images may then be aligned and merged with the sharpest image. For instance, alignment may be attempted between each of the secondary images and the sharpest image, respectively. If the alignment fails for parts of a respective secondary image, those parts may be discarded, and not combined with the primary image. In this way, the sharpest image may be denoised with information from some or all of the secondary images.

In the second example, the scene type is HDR. In this example, the payload burst structure includes ten images captured according to a pattern of long and short TETs, and may be referred to as an "HDR burst structure." In the Payload Burst Structure column of Table 1, each "L" may represent an image captured with the long TET, each "S" may represent an image captured with the short TET. Thus, the pattern of "L S L L S L L S L L" may indicate that the first image of the payload burst is captured using the long TET, the second image is captured using the short TET, the third and fourth images are captured using the long TET, the fifth image is captured using the short TET, the sixth and seventh images are captured using the long TET, the eighth image is captured using the short TET, the ninth image is captured using the long TET, and the tenth image is captured using the long TET.

The long and short TETs may be determined based on the results of image processing 308. Thus, the long and short TETs may be selected so that the resulting images captured with these TETs can be combined using HDR procedures. The long TET may be used to capture the details in dark sections of the scene, while the short TET may be used to capture the details in bright sections of the scene.

Examples of short TET values may include TETs of 1 millisecond, 2 milliseconds, and/or 8 milliseconds, while examples of long TET values may include TETs of 20 milliseconds, 40 milliseconds, and/or 80 milliseconds. However, short and long TETs may take on different values.

Despite the payload burst in the second example having a particular structure in Table 1, other structures may be used. For example, payload burst structures of "L S L S L S L S L S" or "L L S L L S L L S L" could potentially provide suitable patterns of long and short TETs. Further, some payload burst structures may include fallback TETs (denoted by an "F"). Thus, additional example payload bursts may include "S F L L L S F L L L" or "S F L S F L S F L L" structures.

In some embodiments, a payload burst structure may include more or fewer than ten images. Generally speaking, determining the length of the payload burst structure involves a tradeoff. On one hand, a long payload burst (i.e., a payload burst with a large number of image captures) is desirable because the likelihood of one or more of the captured images being properly-exposed and sharp is increased. On the other hand, if the payload burst is too long, the likelihood of ghosting due to movement in the scene is also increased. Additionally, darker scenes may benefit from images captured using a longer TET, so that more light can reach the recording surface. Therefore, the payload burst structure may be based, possibly in part, on these considerations.

In the third example, the scene type is also HDR. However, in this example, the associated payload burst structure (which also may be referred to as an HDR burst structure) includes seven images captured according to a pattern of long and short TETs, followed by three fallback TETs. Each "F" may represent an image captured with the fallback TET, and the fallback TET may take on a value different from both the long and short TETs.

Regardless of the type of payload burst structure, the images of an HDR scene may be aligned and combined.

Images captured using the short TET may be referred to as "short-exposure images" for convenience, and images captured with the long TET may be referred to as "long-exposure images" for convenience.

In some embodiments, the sharpest short-exposure image may be selected, from the short-exposure images, as the primary short-exposure image. Zero or more of the remaining secondary short-exposure images may then be aligned and merged with the primary short-exposure image. For instance, alignment may be attempted between each of the secondary short-exposure images and the primary short-exposure image, respectively. If the alignment fails for parts of the respective secondary short-exposure image, those parts may be discarded, and not combined with the primary short-exposure image. In this way, the sharpest short-exposure image may be de-noised with information from some of the secondary short-exposure images.

The same or a similar process may be undertaken for the long-exposure images. For example, the sharpest long-exposure image may be selected, from the long-exposure images, as the primary long-exposure image. Zero or more of the remaining secondary long-exposure images may then be aligned and merged with the primary long-exposure image. Alignment may be attempted between each of the secondary long-exposure images and the primary long-exposure image, respectively. If the alignment fails for parts of the respective secondary long-exposure image, those parts may be discarded, and not combined with the primary long-exposure image.

The resulting combined short-exposure image (e.g., the sharpest short-exposure image possibly de-noised by information from zero or more secondary short-exposure images) and the resulting combined long-exposure image (e.g., the sharpest long-exposure image possibly de-noised by information from zero or more secondary long-exposure images) may then be aligned. If the alignment succeeds, these two images (e.g., both LDR images) may be combined according to HDR procedures. For instance, they may be combined into an HDR image, and the HDR image may then be tonemapped so that its brightness falls within a range commensurate with the display abilities of convention video output devices (e.g., pixel values between 0 and 255, inclusive). The resulting tonemapped HDR image may be designated as output image 318. In some embodiments, if the signal-to-noise ratio of part or all of output image 318 is still lower than a threshold value, a de-noising procedure may be applied to further reduce noise. Additionally, output image 318 may also be sharpened, possibly after applying the de-noising procedure. In general, various types of HDR fusion algorithms, such as Exposure Fusion or Local Laplacian Filters, may be used to merge short and long-exposure images. If fallback TETs are used in the payload burst structure, these HDR fusion algorithms may be applied to one or more fallback images as well.

If the alignment fails between the combined short-exposure image and the combined long-exposure image, then the HDR processing fails. However, if fallback images were captured, one or more of the fallback images may be used to form output image 318. For instance, the sharpest fallback image may be selected. Zero or more of the remaining secondary fallback images may be aligned and combined with the sharpest fallback image carried out in a similar fashion as the processes described above for the short and long-exposure images. For payload burst structures without fallback images in which alignment fails, the combined long or short-exposure image may be used to form output image 318.

Generally speaking, image alignment may involve computational methods for arranging two or more images over one another so that they "match." Once the images are aligned, various functions can be performed, such as image enhancement (e.g., noise reduction), image stabilization (e.g., to compensate for the shaking of a video camera), pattern matching (e.g., identification of common elements in two or more images), and object recognition (e.g., finding a specific object in two or more images), as well as other functions.

Given the various uses of image alignment, it is advantageous to be able to perform image alignment in an efficient and robust fashion. In practice, a global alignment (i.e., translating the whole image by a number of pixels on the x-axis and by a potentially different number of pixels on the y-axis) may be performed. Alternatively, instead of or in addition to aligning the whole image according to these x and y offsets, it may be advantageous to break the image into a number of smaller tiles, where each tile is an i×j pixel block, and align these tiles separately according to respective individual offsets. The size of each tile may be as small as a 1×1 pixel block (i.e., one pixel). The result the alignment might include some tiles being offset differently than others.

Numerous image alignment techniques may be used with the embodiments herein. For instance, one possible option is to use optical flow, which performs both global (e.g., image level) alignment and local (e.g., the level and/or pixel level) alignment. Other techniques include using affine transforms or homography for global alignment, followed by any type of local alignment. An affine transform may result in one of the images being shifted, scaled, and rotated as it is aligned to the other image. A homography transform may result in one of the images being shifted, scaled, rotated, and warped as it is aligned to the other image. The local alignment may involve using row and/or column sums, Fourier transforms, brute force, or other techniques to refine the global alignment.

Figure 4:
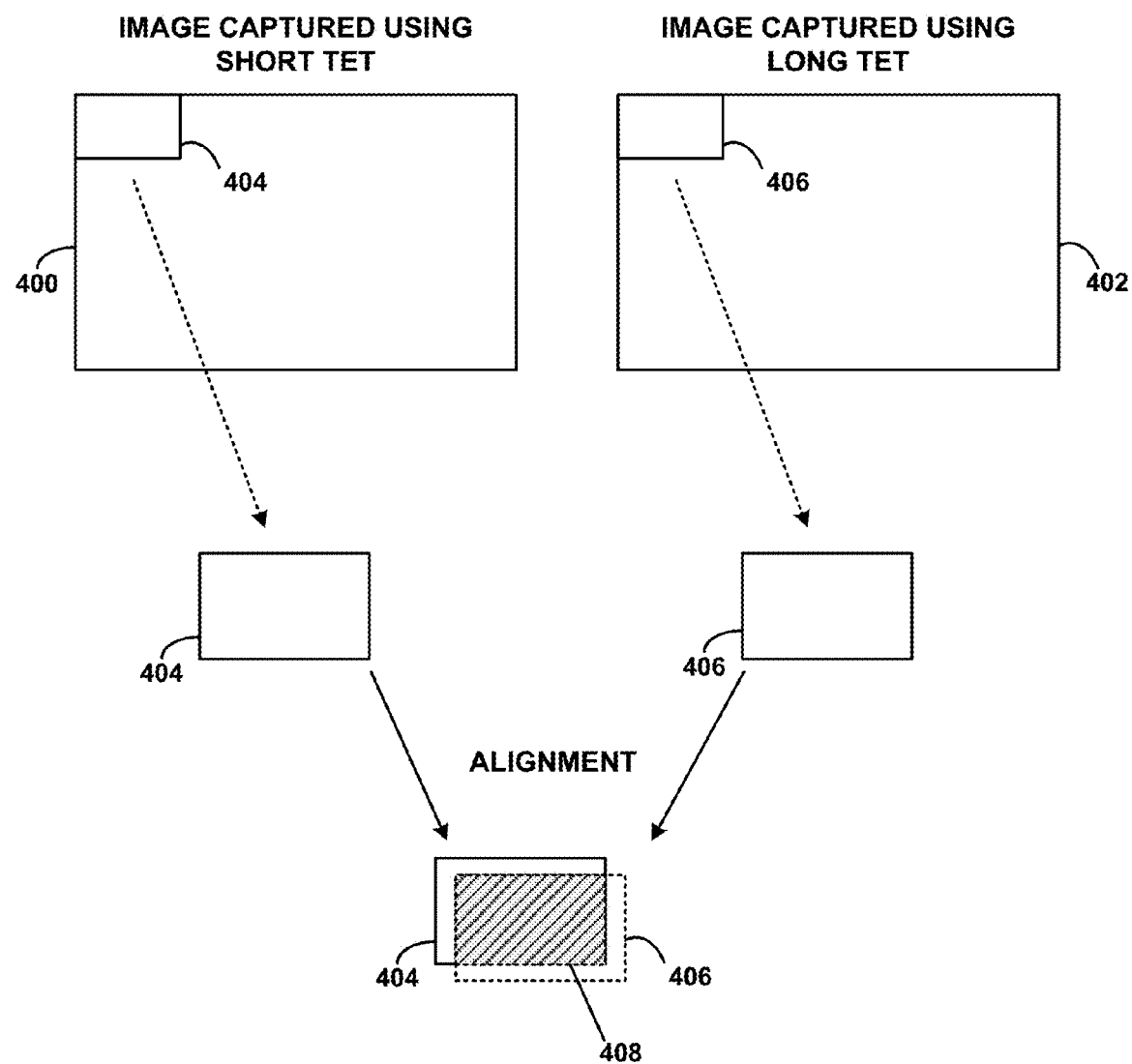
FIG. 4 depicts image alignment, in accordance with an example embodiment.

FIG. 4 depicts an example alignment of a short TET image 400 ("short-exposure image 400") and a long TET image 402 ("long-exposure image 402"). Short-exposure image 400 may be a combined short-exposure image, and/or long-exposure image 402 may be a combined long-exposure image. Short-exposure image 400 and long-exposure image 402 may have been captured, perhaps during second image capture 314, as part of a payload burst of images of a scene. Alternatively, the example alignment depicted in FIG. 4 may be between two or more images captured with a similar or identical TET. For instance, all images may have been captured using a short TET, a long TET, or some other TET.

Optionally, short-exposure image 400 and long-exposure image 402 may be divided into i×j pixel tiles, and associated pair of tiles may be aligned with one another. For instance, tile 404 from the upper left hand corner of short-exposure image 400 and tile 406 from the upper left hand corner of long-exposure image 402 may be selected for alignment with one another. As shown in FIG. 4, either tile 404 or tile 406 may be shifted vertically or horizontally during the alignment process. This shifting may occur due to movement in the scene or movement of the camera device between when short-exposure image 400 and long-exposure image 402 are captured. Nonetheless, the resulting overlap area 408 between short-exposure image 400 and long-exposure image 402 may encompass only subsets of each image. The illustrated procedure of aligning individual tiles may be repeated for all pairs of tiles in short-exposure image 400 and long-exposure image 402.

Alternatively, overlap area 408 may encompass more than just a tile of short-exposure image 400 or long-exposure image 402. For instance, tile 404 may be selected from short-exposure image 400. Then, tile 404 may be "slid" around and/or placed in a series of locations in long-exposure image 402 until a sufficient match between the contents of tile 404 and a corresponding region of long-exposure image 402 is found. Then, a pixel by pixel pairwise alignment of tile 404 with this region may be performed.

As part of the alignment process, various checks may be performed to determine the accuracy of the alignment. If these checks indicate that the alignment is reasonably accurate (e.g., one or more values that measure alignment error are within pre-determined tolerances), then the images may be merged according to the alignments of each pair of tiles. As noted above, the merging process may use various types of HDR fusion algorithms, such as Exposure Fusion and/or Local Laplacian Filters.

One possible disadvantage of HDR is that "ghosting" may occur when two or more images of a scene are merged, especially if these images were captured at different times. For instance, some image capture hardware operates on a cycle of approximately 30 Hz, or 33 milliseconds, between or during sequential image captures. Thus, the merging of two images of the same scene may result in ghosting due to movement of objects within the scene, or of the image capture device itself, that occurred between when these images were captured. This ghosting might occur even if the two images were sequentially captured.

If one or more images attempting to be combined exhibit ghosting, the combining may fail. For instance, ghosting between a long-exposure image and a short-exposure image may prevent these images from being properly aligned.

One way to avoid these drawbacks is to capture two or more short-exposure images, and combine them into a merged short-exposure image. This merged short-exposure image may properly expose some or all of the brighter sections of the scene, but might not properly expose some of the darker sections of the scene. However, a digital gain may be applied to this merged short-exposure image. The digital gain may be a multiplicative function of a value that represents the brightness of pixels. For instance, for the YCbCr color model, a gain of 2 may be implemented as multiplying the Y value of pixels by 2.

The resulting image with this digital gain applied may be referred to as a virtual long-exposure image, as it approximates the characteristics of a long-exposure image of the scene. For instance, applying a digital gain of 2 to a short-exposure image that was captured with a TET of x may result in the virtual long-exposure image having approximately the same effective exposure time as an image captured using a TET of 2x.

Thus, a virtual long-exposure image may be associated with a virtual long TET. The virtual long TET may be equal to, may represent, or may approximate the TET with which a true long-exposure image may have been capture, but the virtual long TET includes a higher gain component than the true long TET. For instance, suppose that the true long TET is 20 milliseconds and consists of an actual exposure time of 10 milliseconds and a gain of 2. Then, a virtual long TET of 20 milliseconds might consist of an actual exposure time of 5 milliseconds and a gain of 4, an actual exposure time of 4 milliseconds and a gain of 5, an actual exposure time of 2 milliseconds and a gain of 10, and so on.

Regardless, the virtual long-exposure image may be combined with the merged short-exposure image using HDR procedures. This procedure of combining a short-exposure image with a virtual long-exposure image that was derived from the short-exposure image may be referred to as simulated HDR.

Alternatively or additionally, a determination may be made of how much digital gain to apply to pixels of the merged short-exposure image, and the determined gain may then be applied directly to these pixels. The gain may be the same for all pixels in the merged short exposure image, or may vary from pixel to pixel or between different groups of pixels. In some situations, this direct application of digital gain to the merged short-exposure image may occur instead of obtaining a virtual long exposure image and/or combining that image with the merged short-exposure image.

An advantage of simulated HDR is that ghosting is either eliminated or dramatically reduced. This is due to the merged short-exposure image and the virtual long-exposure image (1) both being captured at the same moment in time, and (2) there being little or no ghosting in the merged short-exposure image.

Another advantage of simulated HDR over standard HDR imaging is that standard HDR imaging typically involves aligning images that were captured with two different exposure times. This aligning may involve applying digital gain to a short-exposure image in order to scale the brightness level of its pixels to that of a long-exposure image. This scaling process may be very sensitive to changes in white balance, nonlinear response curves of the sensor, blooming of bright light sources around hard edges, and so on. Consequently, this alignment may fail, and as a result, HDR imaging may be aborted for the image. But with simulated HDR, the virtual long-exposure image is based one or more of the short-exposure images. Thus, the alignment step between exposures of different lengths may be skipped entirely (however, alignment between the short-exposure images that are combined with one another to form the merged short-exposure image may still take place).

Figure 5:
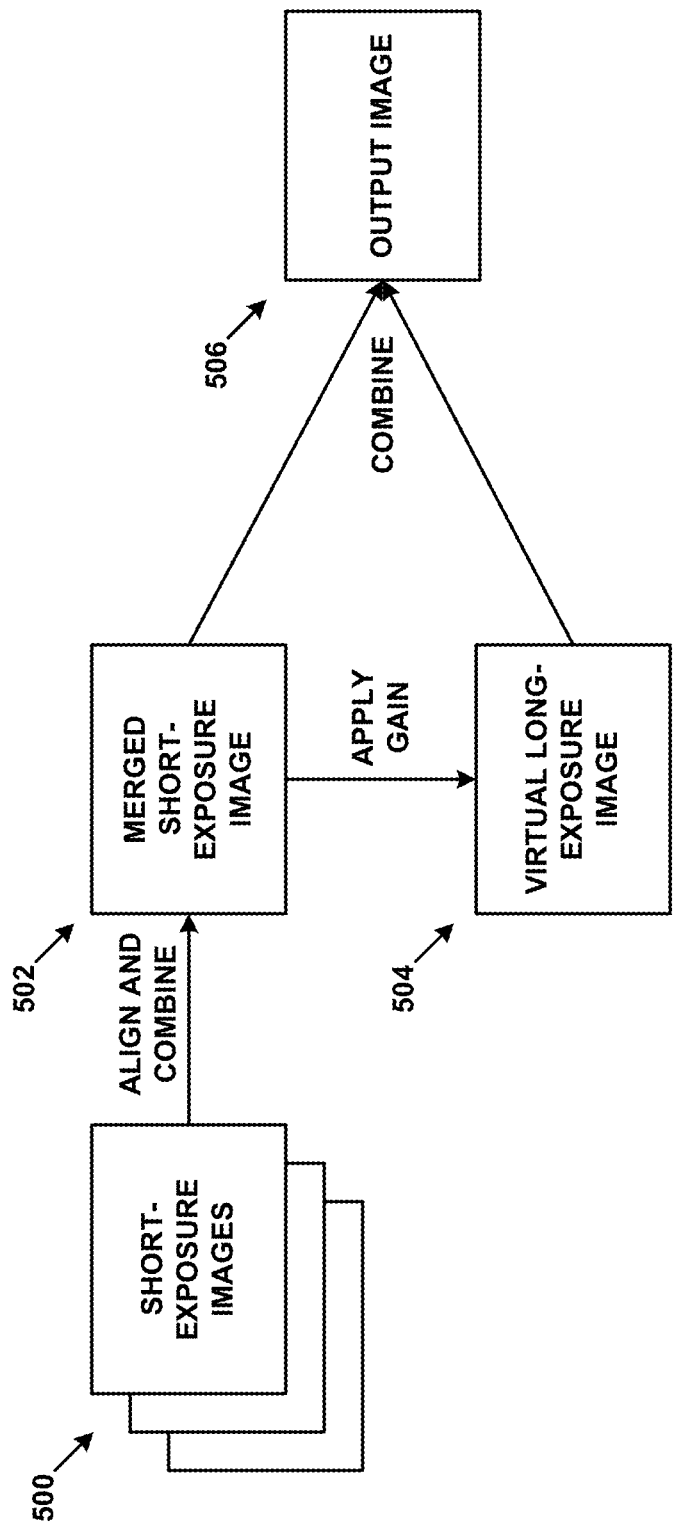
FIG. 5 depicts creating and using a virtual long-exposure image, in accordance with an example embodiment.

Simulated HDR procedures are illustrated in FIG. 5. Two or more short-exposure images 500 are aligned and combined to form merged short-exposure image 502. The same TET may be used to capture each of these short-exposure images, and this TET may be selected to properly expose the bright sections of the scene. In some implementations, 5-10, 2-20, 2-30, or more short-exposure images may be captured using this TET. However, short-exposure images 500 might include more or fewer images.

Regardless, merged short-exposure image 502 is likely to exhibit very little noise because information from each of the images used in the merge operation may be incorporated into merged short-exposure image 502. This combining may be performed in a way that is robust to ghosting by only merging pixels that are successfully aligned, and rejecting those that are not (this decision can be aided by a noise model of the image capture device). Nonetheless, the dark sections of merged short-exposure image 502 may still be under-exposed.

Gain may be applied to merged short-exposure image 502 to form virtual long-exposure image 504. The gain may be, for instance, a multiplicative digital gain. In some implementations, applying digital gain may involve reversing some or all color processing applied so far to virtual long-exposure image 504 (e.g., tonemapping, an RGB mapping, white balance gains, lens shading correction, and so on) to obtain the raw, linear color values that were received by the sensor, applying the gain, and then re-applying the aforementioned color processing. Typically the digital gain may be within the range of 1 to 5, but values outside of this range may be used instead.

Alternatively or additionally, the alignment and combining of the short-exposure images may occur before color processing. Then, digital gain may be applied to the resulting "unprocessed" merged short-exposure image, and afterward color processing may be applied as well. In some variations, a different color processing may be applied to the merged short-exposure image and the virtual long-exposure image. For instance, color processing might be applied to these images based on information about the scene gathered by the metering burst. Thus, as an example, if the scene includes two different color temperatures, one for the bright sections and another for the dark sections, the color processing applied to the short-exposure image and the virtual long-exposure image may vary to accommodate these color temperatures.

Regardless, applying digital gain to an image may increase the noise in the image. However, as noted above, merged short-exposure image 502 is likely to contain very little noise. Thus, the resulting noise in virtual long-exposure image 504 should be lower than if the same amount of digital gain were applied to a single short-exposure image. In some embodiments, multiple virtual long-exposure images, each created by applying different digital gains, may be created from merged short-exposure image 502.

Merged short-exposure image 502 and virtual long-exposure image 504 may then be combined to form output image 506. If multiple virtual long-exposure images are created, two or more of these may be combined into output image 506. A local tonemapping technique may be to select the sections of each image with the best exposures. Alternatively or additionally, Exposure Fusion, Local Laplacian Filters, etc. may be used.

In some embodiments, the dynamic range of the scene (i.e., the difference in brightness between the darker sections and the lighter sections) may be determined. Based on the determined dynamic range of the scene, LDR, HDR, or simulated HDR might be used to capture image(s) of the scene.

Alternatively or additionally, it may be assumed that the scene is an HDR scene (e.g., that the scene exhibits a dynamic range associated with the use of HDR). The values of the long and short TETs that would be used to capture the scene using HDR imaging may be determined. If the ratio of the long TET to the short TET is greater than a lower threshold (e.g., 1.25, 1.5, 1.75, 2.0, or some other value), and/or less than an upper threshold (e.g., 3.5, 5.0, 6.5, 7.0, 7.5, or some other value), then simulated HDR may be used. On the other hand, if this ratio is at or below the lower threshold, LDR imaging may be used, and if this ratio is at or above an upper threshold, then traditional HDR may be used.

In some embodiments, the lower threshold, the upper threshold, or both may vary based on characteristics of the scene. For example, the upper threshold might vary based on the average brightness of the scene. If the average brightness of the scene is high, a higher upper threshold might be used (e.g., 6.5). However, if the average brightness of the scene is low, a decreased upper threshold may be used (e.g., 3.5).

Also, when the ratio is high (e.g., above 3.0, 3.5, 4.0, etc.), the TETs of short-exposure images may be increased but the gain applied to these short-exposure images may be decreased. Doing so reduces the amount of digital gain that needs to be applied to the long-exposure image(s), which in turn may limit the amount of color correction needed (see below). For instance, the short TET used capture the short-exposure images may be increased so that the digital gain to be applied to form the virtual long-exposure image is no more than a particular value.

Alternatively, the dynamic range of the scene may be expressed as an absolute difference in brightness values in the scene (i.e., the difference in brightness between the darkest sections and the lightest sections). If this dynamic range is greater than a lower threshold and/or less than an upper threshold, then simulated HDR imaging may be used. Or, if the dynamic range is at or below the lower threshold, LDR imaging may be used, and if the dynamic range is at or above an upper threshold, then traditional HDR may be used.

Regardless, in some embodiments, one or more of LDR, HDR, and/or simulated HDR may be used, forming up to three output images. One or more of these output images may be selected for viewing, further processing, and so on.

Figure 6:
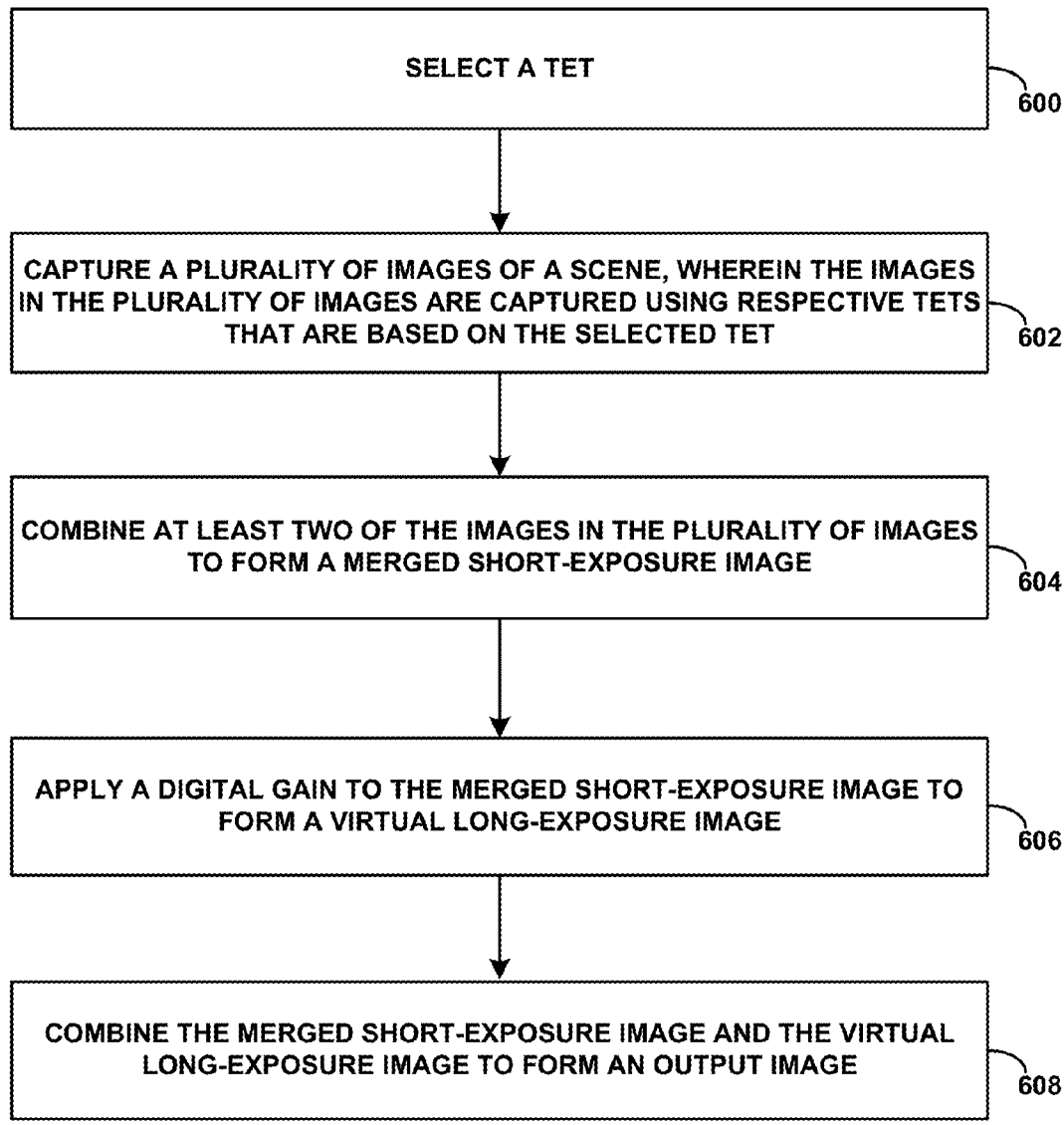
FIG. 6 is a flow chart, in accordance with an example embodiment.

FIG. 6 depicts a flow chart, in accordance with an example embodiment. At step 600, a TET may be selected. This TET may be selected based on the techniques disclosed in the context of FIG. 3, or by other methods. For instance, the TET may be selected based on one or more captured metering images.

At step 602, a plurality of images of a scene may be captured. The images in the plurality of images may be captured using respective TETs that are based on the selected TET. Each of these respective TETs may be the same as the selected TET, or may vary to an extent (e.g., up to 5% or 10%) from the selected TET. In some embodiments, the plurality of images may be captured within a time span of 1 second or less.

At step 604, at least two of the images in the plurality of images may be combined to form a merged short-exposure image. In some implementations, between 2 and 30 images from the plurality of images may be combined to form the merged short-exposure image. Alternatively, between 3 and 10 images from the plurality of images may be combined to form the merged short-exposure image. In some cases, only the n sharpest of these images may be combined. A dynamic range of the merged short-exposure image may represent a range of pixel brightnesses in the merged short-exposure image.

In some embodiments, the number of short-exposure images captured may be based on the expected amount of digital gain that would be later applied. For instance, in HDR scenes, if the ratio of the long TET to the short TET is small (e.g., below 2.0), less digital gain might be applied and fewer short-exposure images may be captured and merged. On the other hand, if this ratio is large (e.g., above 5.0), more digital gain might be applied and more short-exposure images may be captured and merged in order to increase the signal-to-noise ratio in the merged short-exposure image.

At step 606, a digital gain may be applied to the merged short-exposure image to form a virtual long-exposure image. The digital gain may apply a multiple of between 1 and 5 to at least some pixel values of the merged short-exposure image.

At step 608, the merged short-exposure image and the virtual long-exposure image may be combined to form an output image. In some cases, more of the output image may be properly-exposed than either of the merged short-exposure image or the virtual long-exposure image. The virtual long-exposure image may be one of a set of virtual long-exposure images formed by applying different digital gains to the merged short-exposure image, and the output image may be formed by combining the merged short-exposure image and at least some of the set of virtual long-exposure images.

Alternatively or additionally to steps 606 and 608, at least two of the images in the plurality of images may be combined to form a merged short-exposure image. A digital gain may be applied to at least some pixels of the merged short-exposure image to form the output image.

In some embodiments, applying the digital gain to the merged short-exposure image and combining the merged short-exposure image and the virtual long-exposure image may occur in response to determining that the dynamic range of the scene is between the lower dynamic range threshold and the upper dynamic range threshold. The virtual long-exposure image may be associated with a virtual long TET, and the dynamic range of the scene may be represented by or correspond to a ratio of the virtual long TET to the selected TET. For example, the lower dynamic range threshold may be between 1.25 and 2, and the upper dynamic range threshold may be between 3.5 and 7. However, other values for the lower dynamic range threshold and/or the upper dynamic range threshold may be used.

Additional embodiments may involve correcting, or otherwise adjusting, the color of a virtual long-exposure image. These color corrections may occur in conjunction with the embodiments of FIGS. 5 and 6, or may occur in other contexts.

In various embodiments, capturing an image of a scene can be difficult due to a lack of light, movement within the scene, and/or movement by the image capture device. For instance, as noted previously, in low-light scenes, long exposure times may be used to capture images. But images captured using long exposures are more susceptible to motion blur than images captured using shorter exposures. Also, in high-motion scenes, such as sports photography, rapid movement within the scene or by the image capture device may make using longer exposure times impractical.

To combat these issues, images may be captured using a limited exposure time, and gain may be applied to the captured image to raise its brightness levels. However, applying gain can exacerbate high-frequency noise, as well as low-frequency color inaccuracies, in the image. These color inaccuracies often come from imperfect lens shading correction, black level calibration, or white balance calibration. For example, if a dark image has a slightly colored tint, it might not be noticeable. But when the image is brightened, via analog or digital gain, the small biases in the color get amplified as well, and the color inaccuracy worsens. As a result, applying gain to an image may result in color inaccuracies that are unacceptable to a human viewer.

For instance, a relatively small color inaccuracy of 2% in a short-exposure image might be unnoticeable or unobjectionable to most people. But, after a digital gain of 4 is applied to this image, the resulting color inaccuracy of approximately 8% might be both noticeable and objectionable. Thus, in some cases, the maximum gain that can be applied might not limited by just noise—instead it may be limited by color inaccuracy as well or in addition to noise.

In some cases, image capture device lens hardware may exhibit specific types of color shading biases at various color temperatures, and these biases may become apparent when gain is applied. For example, an image of a white surface might take on a purple overtone when gain is applied.

In some implementations, a true long-exposure image may be captured along with the one or more short-exposure images to which digital gain is applied. Unlike the virtual long-exposure image that results from applying the gain to the short-exposure image(s), the true long-exposure is unlikely to have the same degree of color inaccuracy.

For instance, the true long-exposure image may be captured using the same TET as the virtual long-exposure image, but with a longer actual exposure time and less gain. Then, a color transfer from the true long-exposure image to the virtual long-exposure image may be performed. In doing so, regions of the true long-exposure image may be compared to corresponding regions of the virtual long-exposure image, and the colors of these regions of the virtual long-exposure image may be modified to match those of the true long-exposure image. In some cases, only the low-frequency characteristics of the color channel(s) will be copied. These color channels may include the R, G, and B channels of the RGB color model, the Cb and Cr channels of the YCbCr color model, and so on.

One particular way of performing color copying may proceed as follows. First, a validation process may be performed on the alignment of the true long-exposure image and the virtual long-exposure image. This validation process may involve creating low-resolution versions of each image and comparing the color and/or brightness values of at least some pixels of these low-resolution versions. If the aggregate error between these pixels is greater than a threshold value, the alignment fails and the color copying may be aborted. Also, if the brightness values (e.g., the Y channel of the YCbCr color model) of the low-resolution versions of these images differ by more than a threshold value, color copying may be aborted.

Then, a low-pass filter may be used to obtain the low-frequency colors characteristics of the low-resolution version of the true long-exposure image. The color transfer of the low-frequency color characteristics of the true long-exposure image to the virtual long-exposure image may then be performed. This can be done with regional histograms, Laplacian or Gaussian pyramids, or any number of other methods.

Figure 7:
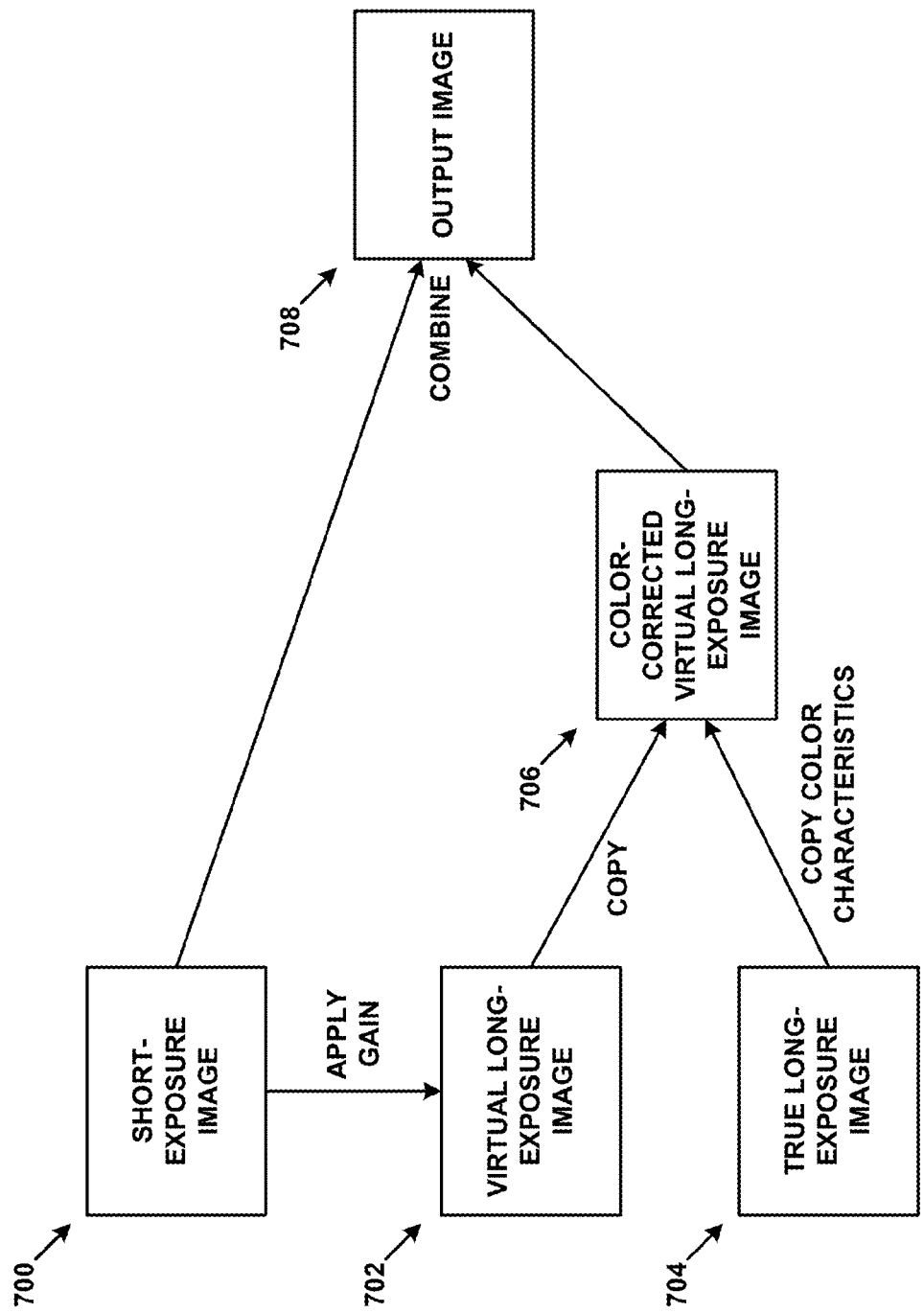
FIG. 7 depicts color correcting a virtual long-exposure image, in accordance with an example embodiment.

FIG. 7 illustrates example color correction procedures. Gain may be applied to short-exposure image 700 to form virtual long-exposure image 702. Short-exposure image 700 may be based on a single short-exposure image, or may have been formed by combining two or more short-exposure images. In some embodiments, 5-10, 2-20, 2-30, or more short-exposure images may have been captured with the same, or approximate the same TET, and combined to form short-exposure image 700. Thus, short-exposure image 700 may be a merged short-exposure image. The TETs used to capture the short-exposure images may be equal to one another or may vary to an extent, but may be within a particular range (e.g., 0.1-1.5 milliseconds, 1-3 milliseconds, 2-5 milliseconds, 3-10 milliseconds, etc.).

Additionally, true long-exposure image 704 may have been captured at the same time, or approximately the same time, as short-exposure image 700 or the images from which short-exposure image 700 were derived. Color characteristics from true long-exposure image 704 may be copied onto virtual long-exposure image 702 to form color-corrected virtual long-exposure image 706.

Short-exposure image 700 and color-corrected virtual long-exposure image 706 may be combined to form output image 708. A local tonemapping technique may be used to select the sections of each image with the best exposures. Alternatively or additionally, Exposure Fusion, Local Laplacian Filters, etc. may be used.

As noted above, these procedures may be used in conjunction with those described above in the context of FIGS. 5 and 6. Thus, for instance, a true long-exposure image may be used to color correct a virtual long-exposure image that is then combined with a merged short-exposure image.

Figure 8:
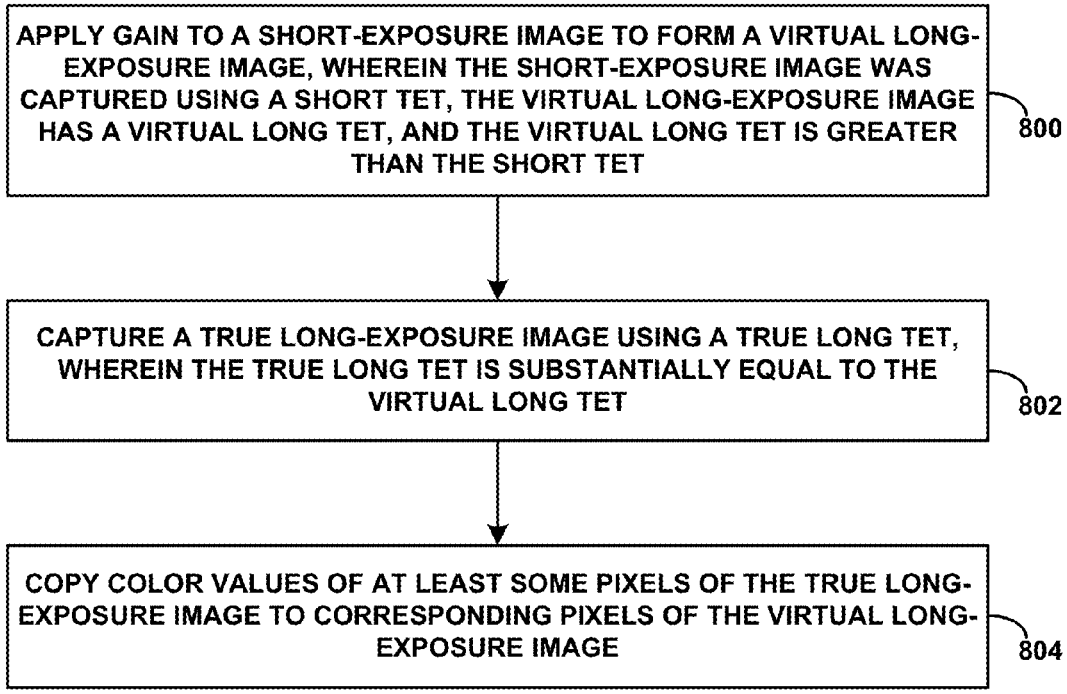
FIG. 8 is another flow chart, in accordance with an example embodiment.

FIG. 8 depicts a flow chart, in accordance with an example embodiment. At step 800, a gain may be applied to a short-exposure image to form a virtual long-exposure image. The short-exposure image may have been captured using a short TET, the virtual long-exposure image may have a virtual long TET, and the virtual long TET may be greater than the short TET. The gain may apply a multiple of between 1 and 5, or some other multiple, to at least some pixel values of the short-exposure image.

At step 802, a true long-exposure image may be captured using a true long TET. The true long TET may be substantially equal to the virtual long TET. In some cases, the true long TET may be equal to the virtual long TET. In other cases, the true long TET may vary by, for example, 1%, 2%, 5%, 10%, etc. from the virtual long TET.

Alternatively or additionally, the true long TET may have an actual exposure time greater than that of the virtual long TET, and a gain that is less than that of the virtual long TET. For instance, if the virtual long TET is 20 milliseconds and includes an actual TET of 4 milliseconds and a gain of 5, the true long TET may include an actual TET of 5 milliseconds and a gain of 4, an actual TET of 10 milliseconds and a gain of 2, an actual TET of 20 milliseconds and a gain of 1 (e.g., no gain applied), and so on.

At step 804, color values of at least some pixels of the true long-exposure image may be copied to corresponding pixels of the virtual long-exposure image. Copying the color values of at least some pixels of the true long-exposure image to the corresponding pixels of the virtual long-exposure image may involve copying low-frequency characteristics of the color values to the corresponding pixels of the virtual long-exposure image.

In some embodiments, the short-exposure image and the virtual long-exposure image may be combined to form an output image. More of the output image may be properly-exposed than either of the merged short-exposure image or the virtual long-exposure image.

Additionally or alternatively, a plurality of preliminary short-exposure images may be captured using the short TET. These preliminary short-exposure images may be combined to form the short-exposure image. The preliminary short-exposure images and the true long-exposure image may be captured within a time span of 1 second or less.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique.

The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising: applying, by a computing device, gain to a short-exposure image to form a virtual long-exposure image, wherein the short-exposure image was captured using a short total exposure time (TET), the virtual long-exposure image has a virtual long TET, and the virtual long TET is greater than the short TET; capturing a true long-exposure image using a true long TET, wherein the true long TET is substantially equal to the virtual long TET; copying color values of at least some pixels of the true long-exposure image to corresponding pixels of the virtual long-exposure image; and combining the short-exposure image and the virtual long-exposure image to form an output image, wherein more of the output image is properly-exposed than the short-exposure image, and wherein more of the output image is properly-exposed than the virtual long-exposure image.

2. The method of claim 1, wherein the true long TET is equal to the virtual long TET.

3. The method of claim 1, wherein the true long TET has an actual exposure time greater than that of the virtual long TET, and a gain that is less than that of the virtual long TET.

4. The method of claim 1, further comprising:
capturing a plurality of preliminary short-exposure images using the short TET; and
combining the plurality of preliminary short-exposure images to form the short-exposure image.

5. The method of claim 4, wherein the plurality of preliminary short-exposure images and the true long-exposure image are captured within a time span of 1 second or less, but more than 0 seconds.

6. The method of claim 1, wherein copying the color values of at least some pixels of the true long-exposure image to the corresponding pixels of the virtual long-exposure image comprises copying low-frequency characteristics of the color values to the corresponding pixels of the virtual long-exposure image.

7. The method of claim 1, wherein the gain applies a multiple of between 1 and 5 to at least some pixel values of the short-exposure image.

8. An article of manufacture including a non-transitory computer-readable medium, having stored thereon program instructions that, upon execution by a computing device, cause the computing device to perform operations comprising: applying gain to a short-exposure image to form a virtual long-exposure image, wherein the short exposure image was captured using a short total exposure time (TET), the virtual long-exposure image has a virtual long TET, and the virtual long TET is greater than the short TET; capturing a true long-exposure image using a true long TET, wherein the true long TET is substantially equal to the virtual long TET; copying color values of at least some pixels of the true long-exposure image to corresponding pixels of the virtual long-exposure image; and combining the short-exposure image and the virtual long-exposure image to form an output image, wherein more of the output image is properly-exposed than the short-exposure image, and wherein more of the output image is properly-exposed than the virtual long-exposure image.

9. The article of manufacture of claim 8, wherein the true long TET is equal to the virtual long TET.

10. The article of manufacture of claim 8, wherein the true long TET has an actual exposure time greater than that of the virtual long TET, and a gain that is less than that of the virtual long TET.

11. The article of manufacture of claim 8, the operations further comprising:
 capturing a plurality of preliminary short-exposure images using the short TET; and
 combining the plurality of preliminary short-exposure images to form the short-exposure image.

12. The article of manufacture of claim 11, wherein the plurality of preliminary short-exposure images and the true long-exposure image are captured within a time span of 1 second or less, but more than 0 seconds.

13. The article of manufacture of claim 8, wherein copying the color values of at least some pixels of the true long-exposure image to the corresponding pixels of the virtual long-exposure image comprises copying low-frequency characteristics of the color values to the corresponding pixels of the virtual long-exposure image.

14. The article of manufacture of claim 8, wherein the gain applies a multiple of between 1 and 5 to at least some pixel values of the short-exposure image.

15. A computing device comprising:
 at least one processor; data storage; and program instructions, stored in the data storage, that upon execution by the at least one processor cause the computing device to perform operations including: applying gain to a short-exposure image to form a virtual long-exposure image, wherein the short exposure image was captured using a short total exposure time (TET), the virtual long-exposure image has a virtual long TET, and the virtual long TET is greater than the short TET; capturing a true long-exposure image using a true long TET, wherein the true long TET is substantially equal to the virtual long TET; copying color values of at least some pixels of the true long-exposure image to corresponding pixels of the virtual long-exposure image; and combining the short-exposure image and the virtual long-exposure image to form an output image, wherein more of the output image is properly-exposed than the short-exposure image, and wherein more of the output image is properly-exposed than the virtual long-exposure image.

16. The computing device of claim 15, wherein the true long TET is equal to the virtual long TET.

17. The computing device of claim 15, wherein the true long TET has an actual exposure time greater than that of the virtual long TET, and a gain that is less than that of the virtual long TET.

18. The computing device of claim 15, wherein copying the color values of at least some pixels of the true long-exposure image to the corresponding pixels of the virtual long-exposure image comprises copying low-frequency characteristics of the color values to the corresponding pixels of the virtual long-exposure image.

19. The computing device of claim 15, the operations further including:
 capturing a plurality of preliminary short-exposure images using the short TET; and
 combining the plurality of preliminary short-exposure images to form the short-exposure image.

20. The computing device of claim 19, wherein the plurality of preliminary short-exposure images and the true long-exposure image are captured within a time span of 1 second or less, but more than 0 seconds.

\* \* \* \* \*